US012731271B2

(12) United States Patent
Martinez et al.

(10) Patent No.: US 12,731,271 B2
(45) Date of Patent: Sep. 8, 2026

(54) ACTIVE LEARNING SYSTEM AND METHOD

(71) Applicant: Toyota Research Institute, Inc., Los Altos, CA (US)

(72) Inventors: Edwardo Martinez, Fremont, CA (US); Vitor Campagnolo Guizilini, Santa Clara, CA (US); Erin A McColl, Los Gatos, CA (US)

(73) Assignees: Toyota Research Institute, Inc., Los Altos, CA (US); Toyota Jidosha Kabushiki Kaisha, Toyota Aichi ken (JP)

(*) Notice: Subject to any disclaimer, the term of this patent is extended or adjusted under 35 U.S.C. 154(b) by 177 days.

(21) Appl. No.: 18/425,436

(22) Filed: Jan. 29, 2024

(65) Prior Publication Data

US 2025/0245842 A1 Jul. 31, 2025

(51) Int. Cl.
*G06T 7/30* (2017.01)
*G06N 3/091* (2023.01)
*G06T 7/50* (2017.01)

(52) U.S. Cl.
CPC ............... *G06T 7/30* (2017.01); *G06N 3/091* (2023.01); *G06T 7/50* (2017.01);
(Continued)

(58) Field of Classification Search
CPC ........ G06V 10/82; G06V 20/58; G06V 20/56; G06T 2207/10016; G06T 2207/30252; G06T 2207/30248; G06T 2207/10028; G06T 7/73; G06T 7/74; G06T 17/00; G06T 2207/20081; G06T 2207/20084;
(Continued)

(56) References Cited

U.S. PATENT DOCUMENTS 10,976,421 B2 4/2021 Zhang et al.
2024/0371035 A1* 11/2024 Jadhav .................... G01S 17/86

FOREIGN PATENT DOCUMENTS

CN 113281780 A * 8/2021 ........... G06F 18/214
CN 115962773 A 4/2023
CN 116758166 A * 9/2023 ............... G06T 7/85

OTHER PUBLICATIONS

Blok, P. M., Kootstra, G., Elghor, H. E., Diallo, B., van Evert, F. K., & van Henten, E. J. (2022). Active learning with MaskAL reduces annotation effort for training Mask R-CNN on a broccoli dataset with visually similar classes. Computers and Electronics in Agriculture, 197, 106917. (Year: 2022).*

(Continued)

*Primary Examiner* — Andrew W Bee
*Assistant Examiner* — Emma E Dryden
(74) *Attorney, Agent, or Firm* — Christopher G. Darrow; Darrow Mustafa PC

(57) ABSTRACT

Disclosed are systems and methods for training an active learning system. In one example, a method for training an active learning system includes the steps of generating a point cloud based on a first image captured at a first pose, projecting the point cloud into a second image captured at a second pose to determine an overlap ratio between the point cloud and the second image, and using the second image to train the active learning system based on probabilities associated with the points of the point cloud projected into the second image and the overlap ratio.

20 Claims, 8 Drawing Sheets

(52) U.S. Cl.
CPC ............... *G06T 2207/10028* (2013.01); *G06T 2207/20081* (2013.01); *G06T 2207/30252* (2013.01)

(58) Field of Classification Search
CPC G06T 5/60; G06T 9/002; G06T 7/337; G06T 7/529; G06T 2207/30244; G06N 3/02; G06N 20/00; G06N 3/045; G06N 3/088; G06N 3/0895; G06N 3/09; G06N 3/091; G06N 3/092; G06N 3/08; G06N 3/0455; G06N 3/047; G06N 3/0475; G06N 3/044; G06N 3/0442
See application file for complete search history.

(56) References Cited

OTHER PUBLICATIONS

Lin, Y., Vosselman, G., Cao, Y., & Yang, M. Y. (2020). Active and incremental learning for semantic ALS point cloud segmentation. ISPRS journal of photogrammetry and remote sensing, 169, 73-92. (Year: 2020).*

Rathnayake, D., Radhakrishnan, M., Hwang, I., & Misra, A. (May 2023). LILOC: Enabling precise 3D localization in dynamic indoor environments using LiDARs. In Proceedings of the 8th ACM/IEEE Conference on Internet of Things Design and Implementation (pp . 158-171). (Year: 2023).*

Zeng, W., Karaoglu, S., & Gevers, T. (2018). Inferring point clouds from single monocular images by depth intermediation. arXiv preprint arXiv:1812.01402. (Year: 2018).*

Wang et al., "Deep Closest Point: Learning Representations for Point Cloud Registration," Proceedings of the IEEE/CVF international conference on computer vision, 2019, pp. 3523-3532.

Chen et al., "PLADE: A Plane-based Descriptor for Point Cloud Registration with Small Overlap," IEEE Transactions on Geoscience and Remote Sensing, 2019, pp. 2530-2540.

Blanton et al., "A Structure-Aware Method for Direct Pose Estimation," Proceedings of the IEEE/CVF Winter Conference on Applications of Computer Vision, 2022, pp. 2019-2028.

Trevor et al., "Efficient Organized Point Cloud Segmentation with Connected Components," Semantic Perception Mapping and Exploration (SPME), 2013, pp. 251-257.

Mei et al., "Overlap-guided Gaussian Mixture Models for Point Cloud Registration," Proceedings of the IEEE/CVF Winter Conference on Applications of Computer Vision, 2023, pp. 4511-4520.

Zhang et al., "Monocular weakly supervised depth and pose estimation method based on multi-information fusion," Kuwait Journal of Science 49.3, 2022, 23 pages.

* cited by examiner

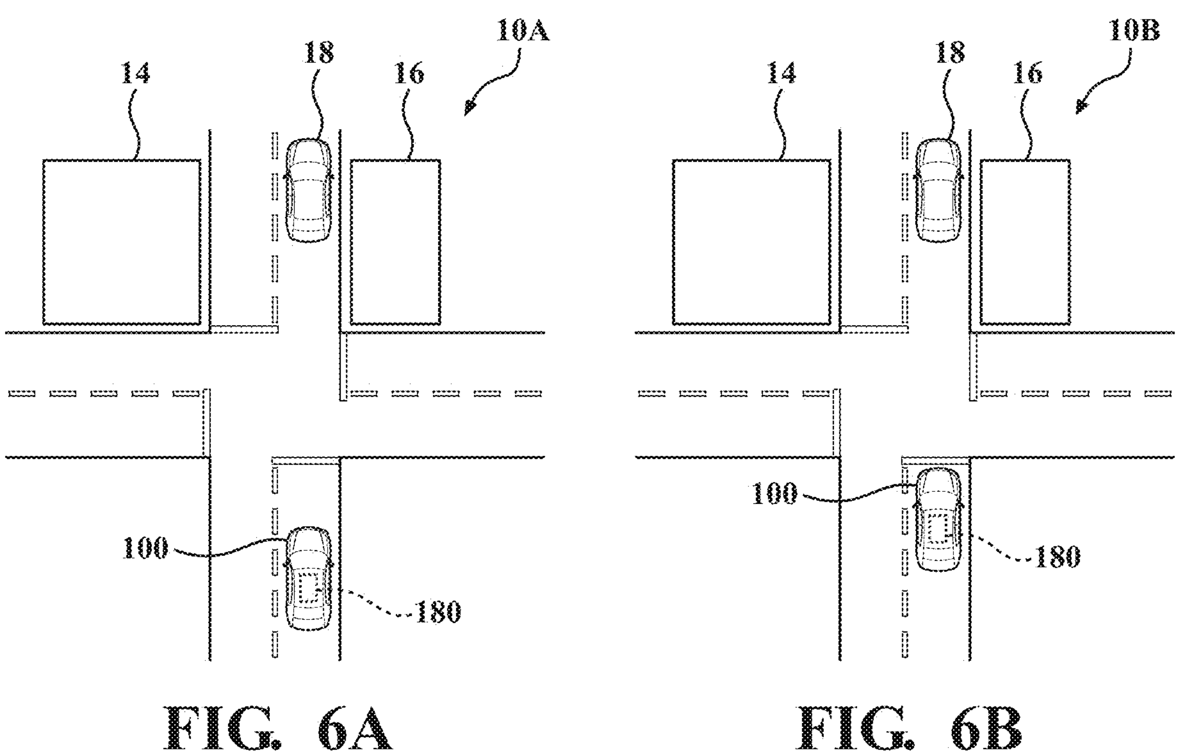
FIG. 6A
FIG. 6B
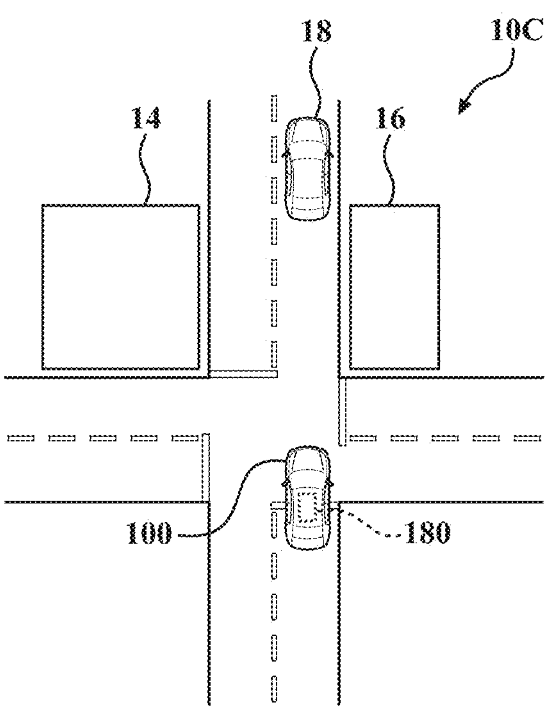
FIG. 6C

ACTIVE LEARNING SYSTEM AND METHOD

TECHNICAL FIELD

The subject matter described herein relates, in general, to active learning systems and related methods.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Perception systems, sometimes found in vehicles, may utilize a camera to capture an image. The image may then be processed using a neural network, sometimes referred to as a model, to output a depth map, which is an image or image channel that contains information relating to the distance of the surfaces of scene objects from the viewpoint of the image captured by the camera. From there, the depth map can then be back-projected into a three-dimensional (3D) space to generate a point cloud. As such, utilizing this methodology, point clouds can be generated using camera sensors instead of much more expensive light detection and ranging (LIDAR) sensors. Additionally, point clouds generated from images are generally much more detailed compared to their sparser LIDAR counterparts.

However, the neural networks used to process the image to generate depth maps and point clouds must be trained. Recent developments in the training of neural networks have resulted in self-supervised training techniques, which train the neural network using unlabeled data. In some cases, the self-supervised training techniques utilize iterative images that can be effectively used to provide supervision without labeled data. Using unlabeled data to train the neural network is advantageous because it does not require labeled data, which can be difficult and expensive to obtain.

Active learning systems have been developed that utilize self-supervised learning techniques to learn as they interact with the environment. When an active learning system performs 3D mapping of an environment using point clouds, the point clouds are iteratively generated. Often, the point clouds will significantly overlap, which may result in additional processing to properly align the separate acquisitions. Conversely, if the point clouds are too far away, they will share no information, which will make it harder to use in self-supervised training techniques. Both situations may result in training the active learning system with data that has low diversity, resulting in poorly trained models.

SUMMARY

This section generally summarizes the disclosure and is not a comprehensive explanation of its full scope or all its features.

In one embodiment, an active learning system includes a processor and a memory in communication with the processor that includes a training module. The training module includes instructions that, when executed by the processor, cause the processor to generate a point cloud based on a first image captured at a first pose, project the point cloud into a second image captured at a second pose to determine an overlap ratio between the point cloud and the second image, and use the second image to train the active learning system based on probabilities associated with the points of the point cloud projected into the second image and the overlap ratio.

In another embodiment, a method for training an active learning system includes the steps of generating a point cloud based on a first image captured at a first pose, projecting the point cloud into a second image captured at a second pose to determine an overlap ratio between the point cloud and the second image, and using the second image to train the active learning system based on probabilities associated with the points of the point cloud projected into the second image and the overlap ratio.

In yet another embodiment, a non-transitory computer-readable medium includes instructions for training an active learning system. The instructions, when executed by a processor, cause the processor to generate a point cloud based on a first image captured at a first pose, project the point cloud into a second image captured at a second pose to determine an overlap ratio between the point cloud and the second image, and use the second image to train the active learning system based on probabilities associated with the points of the point cloud projected into the second image and the overlap ratio.

Further areas of applicability and various methods of enhancing the disclosed technology will become apparent from the description provided. The description and specific examples in this summary are intended for illustration only. They are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 6A-6C illustrate examples of different scenes wherein the vehicle incorporating the active learning system determines when to use a particular image for training the active learning system.

DETAILED DESCRIPTION

Described are an active learning system and method for training an active learning system. The active learning system can take any one of a number of different forms and may be incorporated within a motorized device, such as a robot or vehicle. Generally, the active learning system may be a system for generating point clouds from images captured on a camera. Since the system is an active learning system, the system may learn by actively interacting with the environment and collecting information so as to train the active learning system in a self-supervised manner. However, instead of simply iteratively collecting information for the training of the active learning system, the system is more selective in determining which information it will use to train the active learning system.

Moreover, the selectivity is based on (1) the uncertainty estimations of the points making the point cloud and (2) the overlap ratio between the point cloud in an acquired image (adjacent frame). By so doing, the active learning system will only be trained in situations where there is low confidence in the points of the point cloud and when the overlap between the point cloud and acquired image is sufficient to efficiently train the active learning system. By so doing, the active learning system can be trained more effectively and efficiently using more diverse training data.

Figure 1:
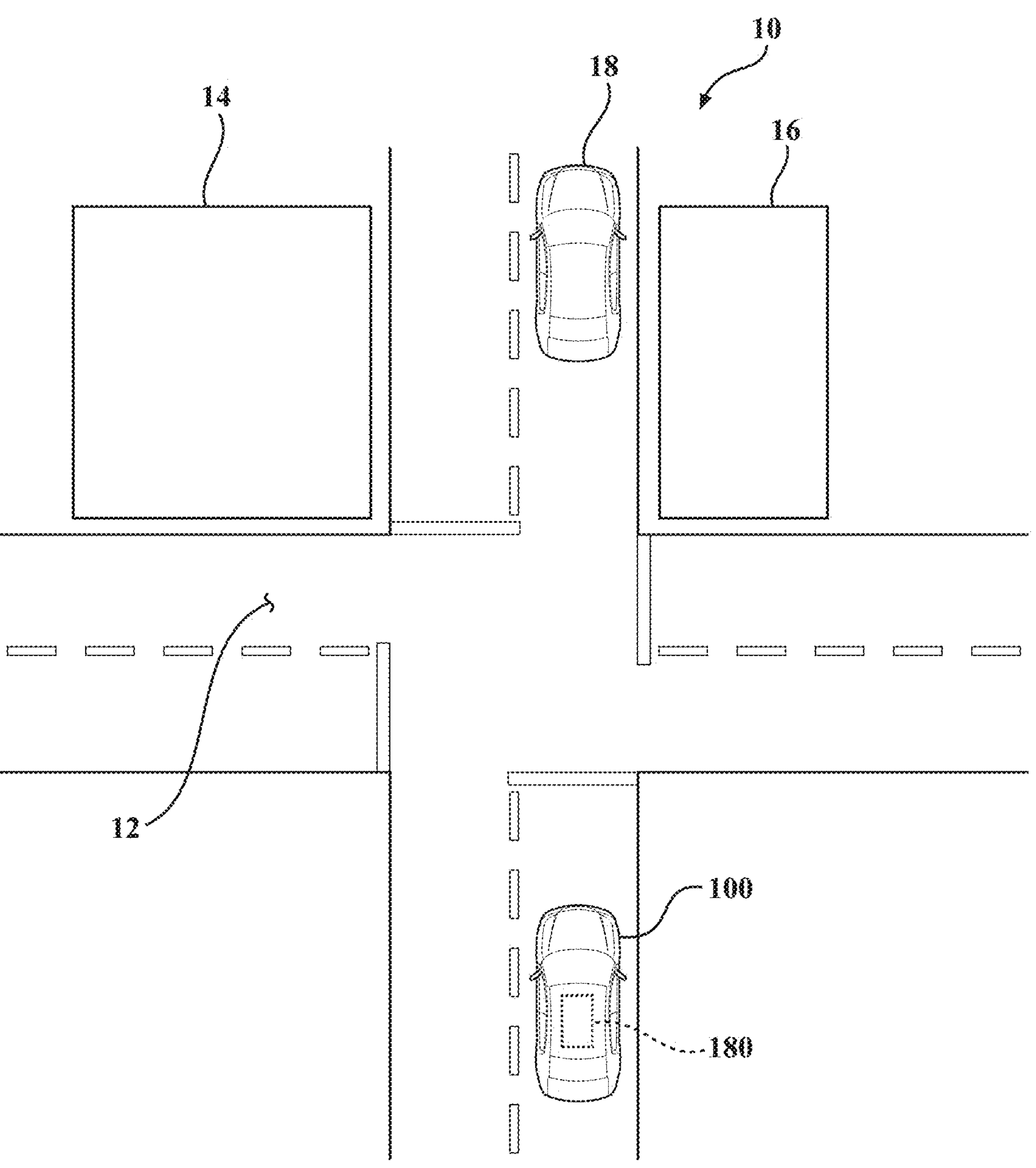
FIG. 1 illustrates a scene including a vehicle that includes an active learning system.
Figure 2:
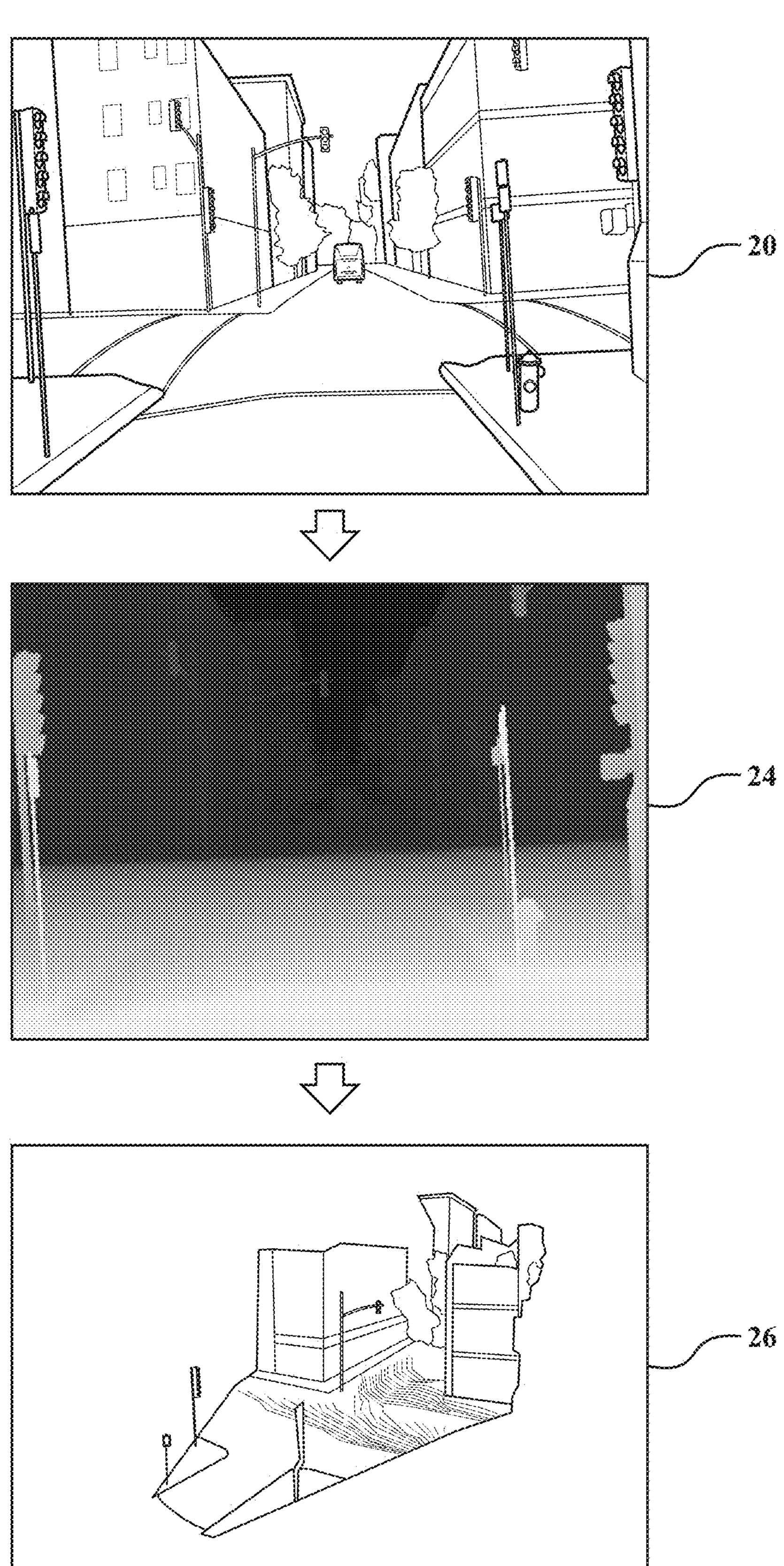
FIG. 2 illustrates the process of generating a point cloud from a captured image.

Referring to FIG. 1, illustrated is one example of a scene 10 that includes a vehicle 100 operating on a road network 12. The vehicle 100 includes the active learning system 180 that may be utilized to generate point clouds of the scene 10. More details regarding the active learning system 180 will be provided later in this description. The scene 10 also includes a number of different objects, such as buildings 14 and 16 and another vehicle 18. As best shown in FIG. 2, the active learning system 180 of the vehicle 100 is able to capture an image 20 from one or more cameras mounted to the vehicle 100, generate a depth map 24 based on the captured image, which can then be utilized to create a point cloud 26.

More specifically, the active learning system 180 may utilize one or more models (neural networks) that are able to convert the image 20 to the depth map 24. Generally, the depth map 24 is an image or image channel that contains information relating to the distance of the surfaces of scene objects from the viewpoint of the camera. As such, the pixels making up the depth map 24 provide some indication regarding the distance to the objects represented in the image 20, such as the buildings 14 and 16 and the vehicle 18.

Once the depth map 24 is created, the point cloud 26 may be generated by back-projecting the depth map 24 into a 3D space. The point cloud 26 includes a set of data points in a 3D coordinate system. Each point of the point cloud 26 represents a single spatial measurement to an object's surface, such as the buildings 14 and 16 and the vehicle 18. In addition to providing a spatial measurement, the points of the point cloud may also provide uncertainty estimations. In one example, each point of the point cloud 26 may have an associated uncertainty estimation, indicating the confidence that the point in the point cloud correctly conveys spatial measurements. In some examples, the uncertainty estimation may be in the form of a Gaussian distribution. As such, point clouds that have points with lower confidence based on uncertainty estimations are generally viewed as being less reliable than point clouds with higher confidence.

The training of the models utilized to process images, such as the image 20, to generate the depth map 24 and the point cloud 26, can be accomplished in a number of different ways. One particular advantageous training methodology involves self-supervised learning. Self-supervised learning is a machine-learning technique that does not utilize labeled data. Moreover, the model is trained on a task using the data itself to generate supervisory signals rather than rely on external labels provided by humans. Moreover, self-supervised learning leverages inherent structures or relationships within the input data to create meaningful training signals. For example, the input data can include a series of sequential images, sometimes referred to as adjacent images, that, due to their relationships, can provide meaningful training signals.

Figure 3:
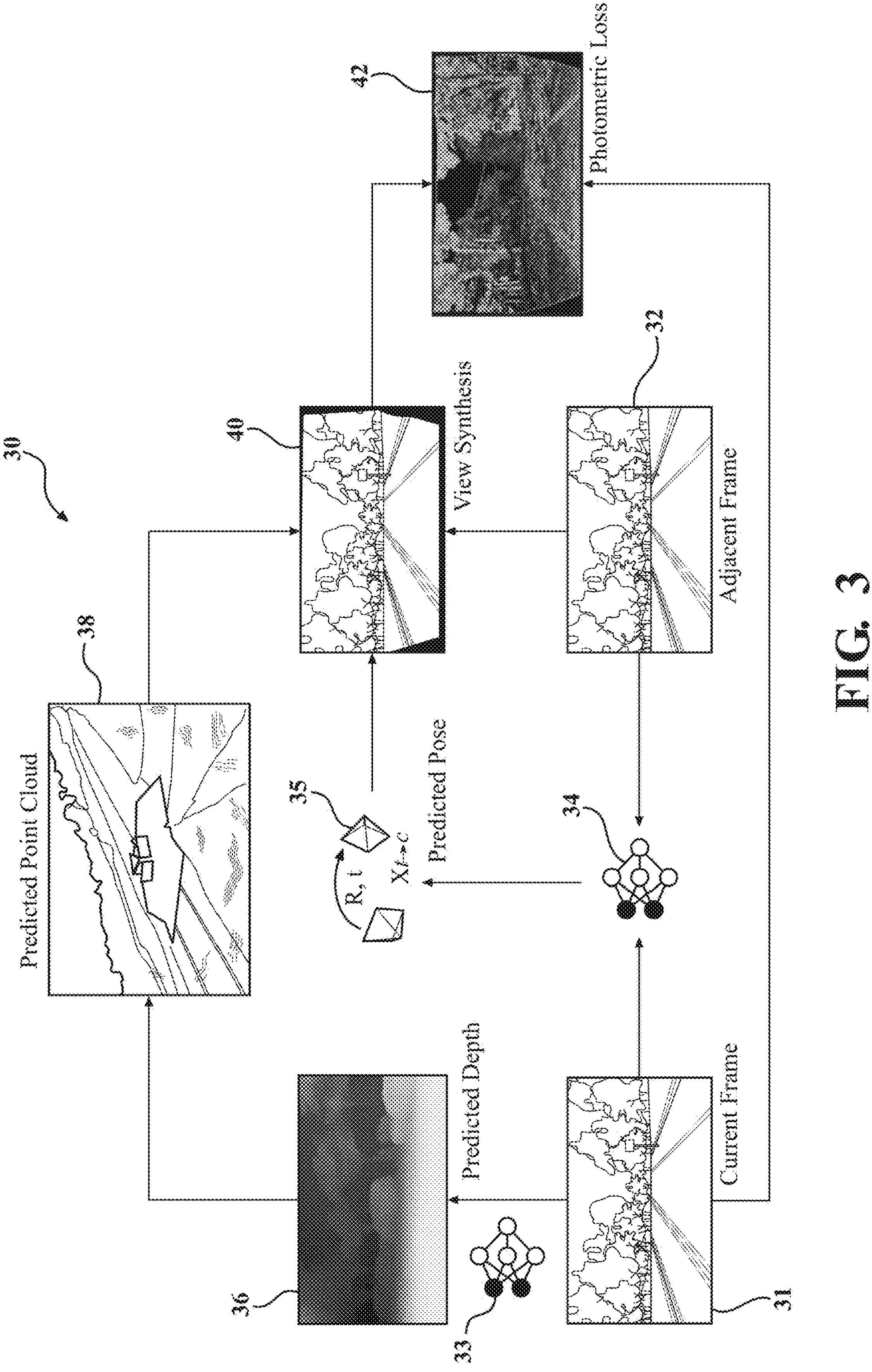
FIG. 3 illustrates the process of training one or more neural networks that can generate a point cloud using an input image.

One example of a process flow 30 for self-supervised learning for generating point clouds is shown in FIG. 3. It should be understood that this is but one method for training a model that generates a point cloud and/or a depth map using adjacent images. Here, a model 33 generates a predicted depth map 36 utilizing a current frame 31. The predicted depth map 36 is utilized to generate the predicted point cloud 38. As explained before, the predicted point cloud 38 may be generated by back-projecting the predicted depth map 36 into a 3D space.

The current frame 31 and an adjacent frame 32 may be provided to a pose model 34 that predicts the pose 35 of the vehicle containing the camera used to generate the current frame 31 and the adjacent frame 32. A synthesized target image 40 can then be generated by utilizing the predicted pose 35, the adjacent frame 32, and the predicted point cloud 38. From there, a photometric loss 42 can be generated by a comparison of the predicted depth map 36 and the synthesized target image 40. The photometric loss 42 can then be utilized to adjust one or more model weights of the model 33 to improve the overall performance of the model 33. Again, it should be understood that this is just one example of a methodology for training a model utilizing self-supervised learning.

As mentioned before, the current frame 31 and the adjacent frame 32 are used to train a model 33 utilizing the process flow 30. However, as mentioned in the background section, if the current frame 31 and the adjacent frame 32 are similar and do not contain new information and/or are too different and do not overlap in a meaningful way, the current frame 31 and the adjacent frame 32 may not be suitable for training a model of an active learning system. As such, the systems and methods described in this description provide a methodology for determining when an adjacent image is suitable for training a model of the active learning system 180.

Figure 4:
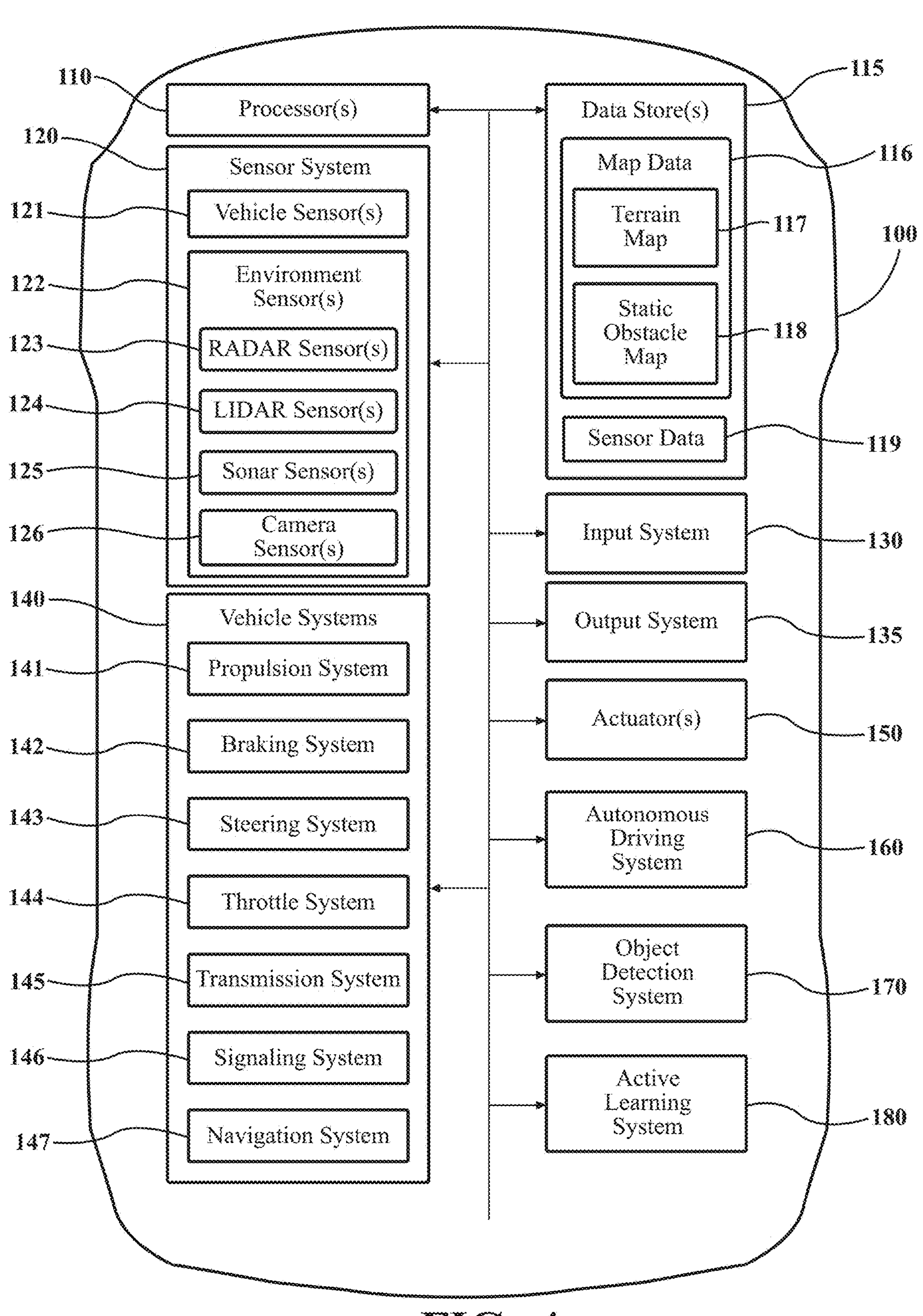
FIG. 4 illustrates a more detailed view of a vehicle incorporating an active learning system.

Referring to FIG. 4, a more detailed view of the vehicle 100 is illustrated that incorporates the active learning system 180. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to an autonomous driving system 160.

The vehicle 100 also includes various elements. It will be understood that in various embodiments it may not be necessary for the vehicle 100 to have all of the elements shown in FIG. 4. The vehicle 100 can have any combination of the various elements shown in FIG. 4. Further, the vehicle 100 can have additional elements to those shown in FIG. 4. In some arrangements, the vehicle 100 may be implemented without one or more of the elements shown in FIG. 4. While the various elements are shown as being located within the vehicle 100 in FIG. 4, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 4 and will be described along with subsequent figures. However, a description of many of the elements in FIG. 4 will be provided after the discussion of FIGS. 5-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

As mentioned, the vehicle 100 includes the active learning system 180. The active learning system 180 may be incorporated within any one of a number of different vehicle systems or subsystems, such as the autonomous driving system 160 and/or an object detection system 170, or may be separate as shown.

Figure 5:
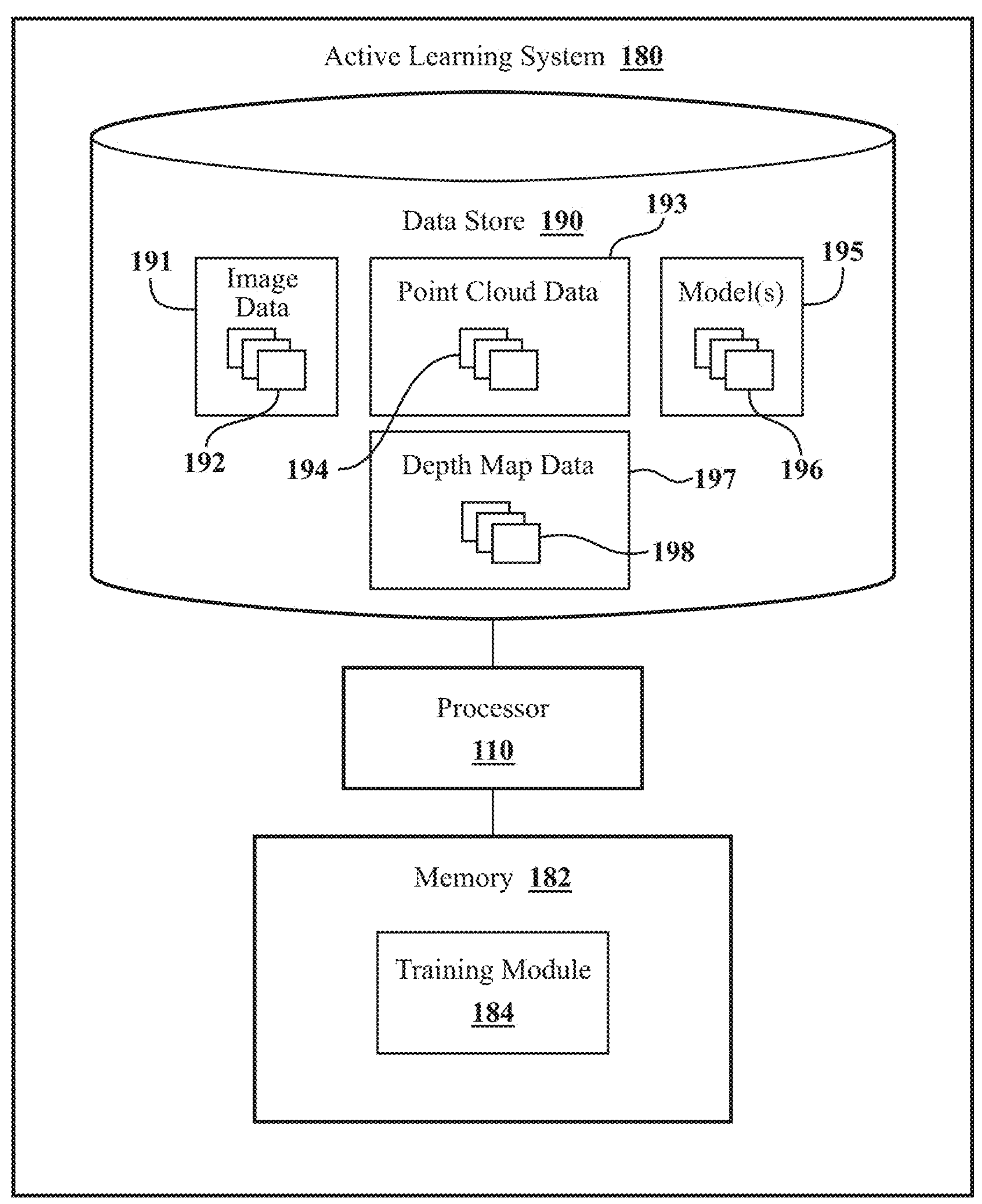
FIG. 5 illustrates a more detailed view of the active learning system.

With reference to FIG. 5, one embodiment of the active learning system 180 is further illustrated. As shown, the active learning system 180 includes one or more processor (s) 110. Accordingly, the processor(s) 110 may be a part of the active learning system 180, or the active learning system 180 may access the processor(s) 110 through a data bus or another communication path. In one or more embodiments, the processor(s) 110 is an application-specific integrated circuit that is configured to implement functions associated with a training module 184. In general, the processor(s) 110 is an electronic processor, such as a microprocessor, which is capable of performing various functions as described herein. In one embodiment, the active learning system 180 includes a memory 182 that stores the training module 184. The memory 182 is a random-access memory (RAM), read-only memory (ROM), a hard disk drive, a flash memory, or other suitable memory for storing the training module 184. The training module 184 is, for example, computer-readable instructions that, when executed by the processor(s) 110, cause the processor(s) 110 to perform the various functions disclosed herein.

Furthermore, in one embodiment, the active learning system 180 includes one or more data store(s) 190. The data store(s) 190 is, in one embodiment, an electronic data structure such as a database that is stored in the memory 182 or another memory and that is configured with routines that can be executed by the processor(s) 110 for analyzing stored data, providing stored data, organizing stored data, generating stored data, and so on. Thus, in one embodiment, the data store(s) 190 stores data used by the training module 184 in executing various functions.

In one embodiment, the data store(s) 190 includes image data 191 that may include images 192 captured by a camera mounted to the vehicle 100, depth map data 197 that may include one or more depth map(s) 198, point cloud data 193 that may include one or more point cloud(s) 194, and one or more model(s) 195, each of which may have model weights 196 that may be adjusted during training. As mentioned before, the images 192 may be monocular images that may be sequential in nature and may be used to train the model(s) 195 in a self-supervised fashion. The depth map data 197 and the point cloud data 193 may be the output of the model(s) 195 that may be ultimately used by other vehicle systems and subsystems, such as the object detection system 170 and/or the autonomous driving system 160.

The training module 184, as mentioned earlier, includes instructions that cause the processor(s) 110 to perform any one of a number of different methodologies described herein. In particular, one of the methodologies contained within the instructions of the training module 184 includes training the model(s) 195 of the active learning system 180 in a self-supervised fashion. As mentioned before, self-supervised learning does not require the use of labeled data but does require the use of data that can provide supervisory signals rather than rely on external labels provided by humans. As will be described in greater detail in the following paragraphs, the training module 184 causes the processor(s) 110 to discern whether an adjacent frame would be a good candidate to train the model(s) 195 of the active learning system 180 by considering the (1) the probabilities of the points making the point cloud, indicating the confidence that the points are correctly providing depth, i.e., uncertainty estimation, and (2) the overlap between the point cloud and an adjacent frame.

As such, the training module 184 may first cause the processor(s) 110 to acquire an image, which may be stored as the image data 191 as one of the images 192 when the vehicle 100 is at a first pose. It should be understood that the pose of the vehicle 100 includes the position and orientation of the vehicle in a 3D space. The acquisition of the image may be caused by utilizing a camera sensor(s) 126, best shown in FIG. 4. For example, FIGS. 6A-6C illustrate three scenes 10A-10C of the vehicle 100 at different poses at different points in time, wherein the earliest point in time (t=0) is shown in FIG. 6A, a later point in time (t=1) is shown in FIG. 6B, and an even later point in time (t=2) is shown in FIG. 6C. In this example, we will assume that the initial image acquired by the processor(s) 110 was acquired at t=0, shown in FIG. 6A.

Once the image has been captured, the training module then causes the processor(s) 110 to generate a depth map, which may be stored in the depth map data 197 as one of the depth map(s) 198. As mentioned before, the depth map may be an image or image channel that contains information relating to the distance of the surfaces of scene objects from the viewpoint of the image captured by the camera.

Thereafter, the training module 184 then causes the processor(s) 110 to generate a point cloud using the depth map, which may be stored in the point cloud data as one of the point cloud(s) 194. Generally, the point cloud may be generated by back-projecting the depth map into a three-dimensional space. In addition, the point cloud that was generated also includes probabilities associated with each of the points. The probabilities generally indicate the confidence in the position information of each point in the point cloud. For example, points in the point cloud that are more certain to be accurate may have a higher probability, while points in the point cloud that are less certain to be accurate may have a lower probability. These probabilities may be represented as a single number or may be represented as a distribution, such as a Gaussian distribution.

As such, the steps mentioned in the prior paragraphs essentially cause the processor(s) 110 to generate a point cloud using the originally acquired image by performing an intermediate step of generating a depth map, which is projected into a 3D space to arrive at the point cloud.

Once a point cloud has been generated, the vehicle 100 may move to a second pose and capture a subsequent image (adjacent frame) using the camera sensor(s) 126. The subsequent image may be stored in the image data 191 as one of the images 192. For example, the vehicle 100 of FIG. 6A may move to a second pose shown in FIG. 6B. As such, the image captured when the vehicle 100 is at the second pose will be different as the vehicle 100 has moved with respect to the buildings 14 and 16. Further still, the vehicle 18 has also moved with respect to the vehicle 100.

Once the adjacent frame has been captured, the training module 184 then causes the processor(s) 110 to determine whether the adjacent frame would be a good candidate for training the model(s) 195 of the active learning system 180. In order to make this determination, the training module 184 causes the processor(s) 110 to make two determinations. In one determination, the training module 184 causes the processor(s) 110 to evaluate the probabilities associated with the points of the previously generated point cloud. For example, the training module 184 may cause the processors(s) to perform any one of a number of different mathematical analyses of the probabilities to determine the overall probability of the point cloud. For example, the training module 184 may cause the processor(s) 110 to perform an average of all the probabilities of the point cloud to obtain either a number or distribution indicating the overall confidence of the point cloud. This overall confidence may be compared to a threshold value indicating when it is appropriate to train the model(s) 195 utilizing the adjacent frame.

This first determination is used to determine how well the model(s) 195 is functioning when the vehicle 100 is at a particular pose. If the model(s) 195 is generally outputting point clouds that have strong confidence numbers, that generally indicates that additional training of the model(s) 195 when the vehicle 100 is at that particular pose would be unnecessary. Conversely, if the model(s) 195 is outputting a point cloud that has low confidence numbers, that would generally indicate that additional training of the model(s) 195 when the vehicle 100 is at that particular pose would be useful.

Figure 7A:
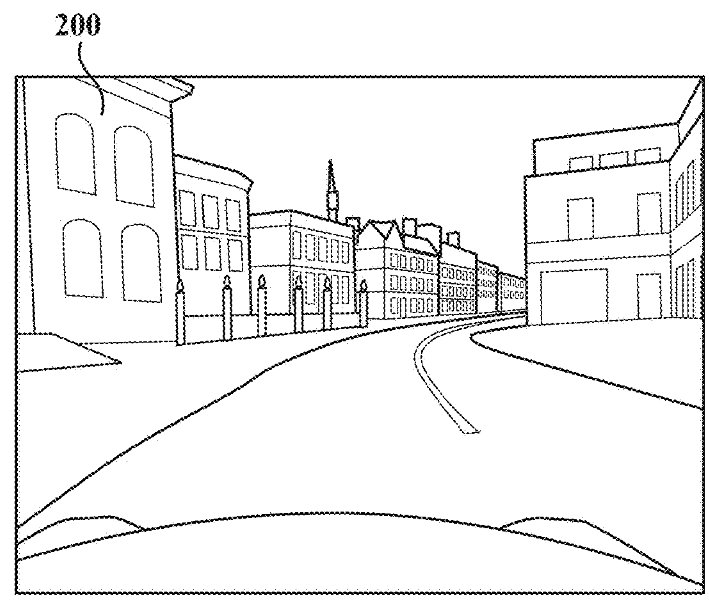
FIGS. 7A-7C illustrate the process of projecting a point cloud into a captured image to determine if the image should be used to train the active learning system.
Figure 7B:
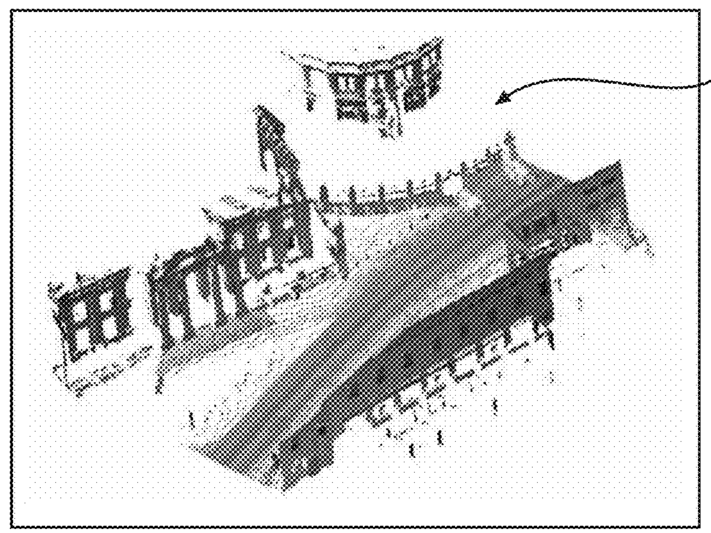
Figure 7C:
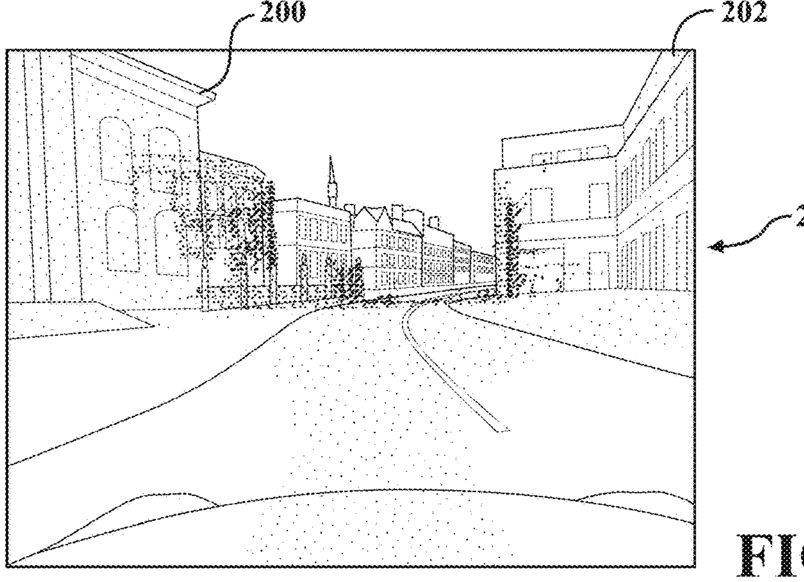

As to the second determination, the training module 184 causes the processor(s) 110 to project the point cloud into the adjacent frame to determine an overlap ratio between the point cloud and the adjacent frame. For example, FIG. 7A-7C illustrate the different components that are required to determine the overlap ratio. Moreover, FIG. 7A illustrates an adjacent frame 200 of a scene, and FIG. 7B illustrates a point cloud 202 generated from a prior frame. FIG. 7C illustrates an overlap 203 wherein the point cloud 202 overlaps onto the adjacent frame 200 to determine the overlap ratio between the adjacent frame 200 and the point cloud 202.

The overlap ratio may be determined by a percentage of pixels of the adjacent frame 200 that are overlapped by points of the point cloud 202. The overlap ratio can then be utilized to determine if the adjacent frame 200 should be utilized to train the model(s) 195 of the active learning system 180. This second determination is useful in determining if the adjacent frame includes enough or not enough additional information to train the model(s) 195. Moreover, if the overlap ratio is too high, such as 75% or greater, the adjacent frame may not contain much new information that would be useful in training the model(s) 195 of the active learning system 180. Conversely, if the overlap ratio is too low, such as 25% or lower, the adjacent frame may not be a good candidate to train the model(s) 195 because appropriate overlap between a current frame and adjacent frame is necessary in order to self-supervised learning. As such, the overlap ratio may be compared to an upper threshold (such as 75%) and a lower threshold (such as 25%) to determine if the overlap ratio is between these two thresholds.

As such, the training module 184 causes the processor(s) 110 to determine if the model(s) 195 should be trained using an adjacent frame based on (1) the overall confidence of the points making up the point cloud and (2) if the adjacent frame has sufficient overlap with the point cloud to effectively train the model(s) 195. In situations where both conditions are satisfied, the training module 184 causes the processor(s) 110 to train the model(s) 195 using the adjacent frame using any one of a number of different self-supervised training techniques, including the self-supervised training technique shown in FIG. 3 and previously described in the above paragraphs. Based on these training techniques, a photometric loss may be determined, and the model weights 196 of the model(s) 195 may then be adjusted based on the photometric loss.

However, in situations where only one or none of the conditions are satisfied, the training module 184 causes the processor(s) 110 to move the vehicle 100 into another pose, such as shown in FIG. 6C. When the vehicle 100 is moved to this third pose, the training module 184 will cause the processor(s) 110 to capture an adjacent frame when the vehicle 100 is at this third pose. The training module 184 will then cause the processor(s) to again determine (1) the overall confidence of the points making up the point cloud and (2) if the adjacent frame captured when the vehicle 100 at the third pose has sufficient overlap at the point cloud to effectively train the model(s) 195. If these conditions are satisfied, the adjacent frame captured at the third pose may be used to train the model(s) of the active learning system 180.

Figure 8:
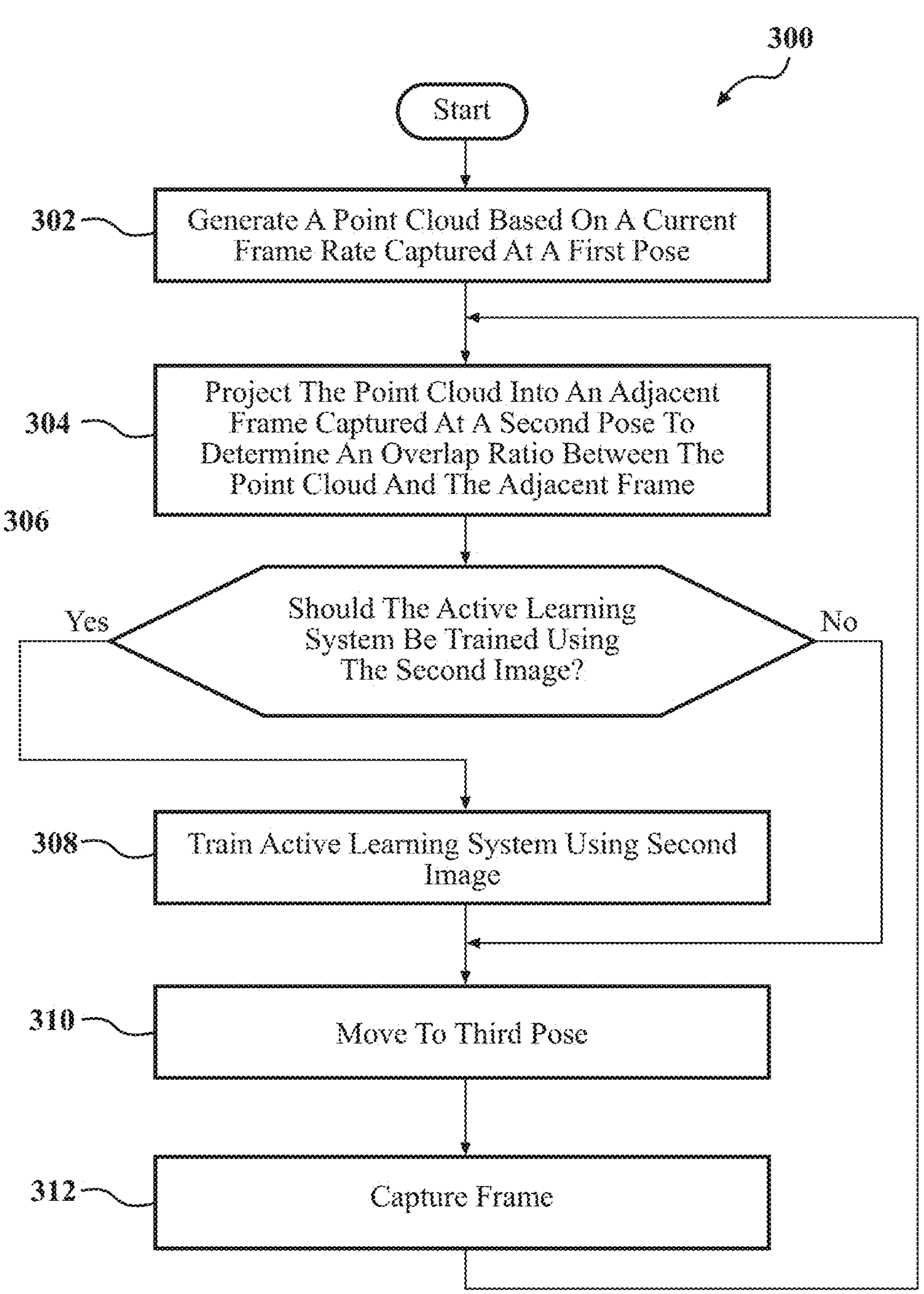
FIG. 8 illustrates a method for training the active learning system.

Referring to FIG. 8, a method 300 for training a model(s) 195 of an active learning system 180 is shown. The method 300 will be described from the viewpoint of the vehicle 100 of FIG. 4 and the active learning system 180 of FIG. 5. However, it should be understood that this is just one example of implementing the method 300. While method 300 is discussed in combination with the active learning system 180, it should be appreciated that the method 300 is not limited to being implemented within the active learning system 180, but is instead one example of a system that may implement the method 300.

In step 302, the training module 184 causes the processor(s) 110 to generate a point cloud based on a current image captured when the vehicle 100 is at a first pose. As mentioned before, the point cloud may include a plurality of points having probabilities associated with these points, indicating the confidence that the spatial information conveyed at each point is correct. The point cloud may be generated by first using the model(s) 195 to generate a depth map, which is then back-projected into a 3D space to generate the point cloud.

In step 304, the training module 184 causes the processor(s) 110 to project the point cloud into an adjacent frame captured when the vehicle 100 is at a second pose to determine the overlap ratio between the point cloud and the adjacent frame. As mentioned before, the overlap ratio may be determined by the percentage of pixels of the adjacent frame that are overlapped by points of the point cloud.

In step 306, the training module 184 causes the processor(s) 110 to determine if the active learning system 180 should be trained using the adjacent frame. This determination is based on (1) the overall confidence of the points making up the point cloud and (2) whether the adjacent frame has sufficient overlap with the point cloud to effectively train the model(s) 195 of the active learning system 180. The first condition is useful in determining if the adjacent frame would be useful for training because if the points making up the point cloud have sufficiently high confidence, such as greater than 80% confidence, this indicates that the model(s) 195 may not benefit from additional training. The second condition is also useful in determining if the adjacent frame should be used for training because if the adjacent frame has a too high or too low overlap ratio, this can indicate that (a) the adjacent frame is too similar to the current frame to provide any useful training data (in cases where the overlap ratio is too high) and/or (b) the adjacent frame is too far removed from the current frame to be used to derive supervisory signals so as to train the model(s) in a self-supervised fashion (in cases where the overlap ratio is too low).

If it is determined that the active learning system 180 should be trained using the adjacent frame, the method 300 proceeds to step 308, where the model(s) 195 of the active learning system 180 will be trained using the adjacent frame using any one of a number of different self-supervised training techniques, including the self-supervised training technique shown in FIG. 3 and previously described in the above paragraphs. Based on these training techniques, a photometric loss may be determined, and the model weights 196 of the model(s) 195 may then be adjusted based on the photometric loss. Thereafter, the method 300 may then proceed to step 310, where the vehicle 100 is moved to a third pose. Once the vehicle 100 is at the third pose, another image may be captured, shown in step 312. After that, the method 300 returns to step 304, wherein the frame captured when the vehicle 100 was at the third pose may be considered as the adjacent frame and may be used for training if all the previously described conditions are satisfied.

Returning to step 306, if it is determined that the adjacent frame should not be used to train the active learning system 180, the method 300 proceeds to step 310, wherein the training module 184 causes the processor(s) 110 to move the vehicle 100 to a third pose. When the vehicle 100 has reached the third pose, the training module 184 causes the processor(s) 110 to capture another frame. After that, the method 300 returns to step 304, wherein the frame captured when the vehicle 100 was at the third pose may be considered as the adjacent frame and may be used for training if all the previously described conditions are satisfied.

As such, the systems and methods described herein are capable of training an active learning system by determining if the adjacent frame should be used to train one or more models that make up the active learning system by considering (1) the probabilities of the points making the point cloud, indicating the confidence that the points are correctly providing depth, i.e., uncertainty estimation, and (2) the overlap between the point cloud in an acquired image (adjacent frame). By so doing, the active learning system will only be trained in situations where there is low confidence in the points of the point cloud and when the overlap between the point cloud and acquired image is sufficient to efficiently train the active learning system. By so doing, the active learning system can be trained more effectively and efficiently using more diverse training data.

FIG. 4 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

As mentioned, the vehicle 100 can include one or more processors(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 4). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify, and/or sense other things in the external environment of the vehicle 100, such as lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more camera sensor(s) 126. In one or more arrangements, the one or more camera sensor(s) 126 can be high dynamic range (HDR) cameras or infrared (IR) cameras.

The vehicle 100 can include an input system 130. An "input system" includes any device, component, system, element, arrangement or groups thereof that enable information/data to be entered into a machine. The input system 130 can receive an input from a vehicle passenger (e.g., a driver or a passenger). The vehicle 100 can include an output system 135. An "output system" includes any device, component, arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 4. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the autonomous driving system 160 can be operatively connected to communicate with the vehicle systems 140 and/or individual components thereof. For example, returning to FIG. 4, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 4, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust, and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, to name a few possibilities.

The vehicle 100 can include one or more modules, at least some of which are described herein. The modules can be implemented as computer-readable program code that, when executed by a processor(s) 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, or other environmental features including traffic signs, trees, shrubs, neighboring vehicles, pedestrians, etc.

The autonomous driving system 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product, which comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An active learning system comprising:

a processor; and a memory in communication with the processor, the memory including a training module with instructions that, when executed by the processor, cause the processor to:

generate a point cloud based on a first image captured at a first pose, wherein the point cloud comprises a plurality of points having probabilities associated with the points, the probabilities indicating a confidence that the points are correctly providing depth, project the point cloud into a second image comprising an adjacent frame with respect to the first image captured at a second pose to determine an overlap ratio between the point cloud and the second image, and use the second image to train the active learning system in a self-supervised fashion when (i) an overall confidence of the point cloud determined from the probabilities satisfies a confidence criterion and (ii) the overlap ratio satisfies an overlap criterion.

2. The active learning system of claim 1, wherein the training module further includes instructions that, when executed by the processor, cause the processor to use the second image to train the active learning system when the overlap ratio is above a lower threshold and below an upper threshold.

3. The active learning system of claim 1, wherein the overlap ratio is a percent of pixels of the second image that the point cloud projects onto.

4. The active learning system of claim 1, wherein the training module further includes instructions that, when executed by the processor, cause the processor to use the second image to train the active learning system when the probabilities associated with the points of the point cloud projected into the second image are below a probability threshold.

5. The active learning system of claim 1, wherein the training module further includes instructions that, when executed by the processor, cause the processor to move the active learning system to a third pose based on at least one of the probabilities associated with the points of the point cloud projected into the second image and the overlap ratio.

6. The active learning system of claim 5, wherein the training module further includes instructions that, when executed by the processor, cause the processor to:

not use the second image to train the active learning system when the overlap ratio is below a lower threshold or above an upper threshold, and move the active learning system to the third pose.

7. The active learning system of claim 5, wherein the training module further includes instructions that, when executed by the processor, cause the processor to:

not use the second image to train the active learning system when the probabilities associated with the points of the point cloud projected into the second image are above a probability threshold and move the active learning system to the third pose.

8. A method for training an active learning system comprising steps of:

generating a point cloud based on a first image captured at a first pose, wherein the point cloud comprises a plurality of points having probabilities associated with the points, the probabilities indicating a confidence that the points are correctly providing depth;

projecting the point cloud into a second image comprising an adjacent frame with respect to the first image captured at a second pose to determine an overlap ratio between the point cloud and the second image; and using the second image to train the active learning system in a self-supervised fashion when (i) an overall confidence of the point cloud determined from the probabilities satisfies a confidence criterion and (ii) the overlap ratio satisfies an overlap criterion.

9. The method of claim 8, further comprising the step of using the second image to train the active learning system when the overlap ratio is above a lower threshold and below an upper threshold.

10. The method of claim 8, wherein the overlap ratio is a percent of pixels of the second image that the point cloud projects onto.

11. The method of claim 8, further comprising the step of using the second image to train the active learning system when the probabilities associated with the points of the point cloud projected into the second image are below a probability threshold.

12. The method of claim 8, further comprising the step of moving the active learning system to a third pose based on at least one of the probabilities associated with the points of the point cloud projected into the second image and the overlap ratio.

13. The method of claim 12, further comprising the steps of:

not using the second image to train the active learning system when the overlap ratio is below a lower threshold or above an upper threshold; and moving the active learning system to the third pose.

14. The method of claim 12, further comprising the steps of:

not using the second image to train the active learning system when the probabilities associated with the points of the point cloud projected into the second image are above a probability threshold; and moving the active learning system to the third pose.

15. A non-transitory computer-readable medium including instructions for training an active learning system, the instructions, when executed by a processor, cause the processor to:

generate a point cloud based on a first image captured at a first pose, wherein the point cloud comprises a plurality of points having probabilities associated with the points, the probabilities indicating a confidence that the points are correctly providing depth;

project the point cloud into a second image comprising an adjacent frame with respect to the first image captured at a second pose to determine an overlap ratio between the point cloud and the second image; and use the second image to train the active learning system in a self-supervised fashion when (i) an overall confidence of the point cloud determined from the probabilities satisfies a confidence criterion and (ii) the overlap ratio satisfies an overlap criterion.

16. The non-transitory computer-readable medium of claim 15, further including instructions that, when executed by the processor, cause the processor to use the second image to train the active learning system when the overlap ratio is above a lower threshold and below an upper threshold.

17. The non-transitory computer-readable medium of claim 15, further including instructions that, when executed by the processor, cause the processor to use the second image to train the active learning system when the probabilities associated with the points of the point cloud projected into the second image are below a probability threshold.

18. The non-transitory computer-readable medium of claim 15, further including instructions that, when executed by the processor, cause the processor to move the active learning system to a third pose based on at least one of the probabilities associated with the points of the point cloud projected into the second image and the overlap ratio.

19. The non-transitory computer-readable medium of claim 18, further including instructions that, when executed by the processor, cause the processor to:

not use the second image to train the active learning system when the overlap ratio is below a lower threshold or above an upper threshold; and move the active learning system to the third pose.

20. The non-transitory computer-readable medium of claim 18, further including instructions that, when executed by the processor, cause the processor to:

not use the second image to train the active learning system when the probabilities associated with the points of the point cloud projected into the second image are above a probability threshold; and move the active learning system to the third pose.

* * * * *